W. WESTLAKE.

Lantern Guard.

No. 3,747.

Reissued Nov. 23, 1869.

Witnesses:
Geo. C. Laubight.
J. Smith.

Inventor:
Wm. Westlake.
by atty. Thos. T. Everett.

N. PETERS. Photo-Lithographer, Washington, D. C.

UNITED STATES PATENT OFFICE.

WILLIAM WESTLAKE, OF CHICAGO, ILLINOIS, ASSIGNOR TO HIMSELF, JAMES F. DANE, AND JOHN P. COVERT, OF SAME PLACE.

LANTERN.

Specification forming part of Letters Patent No. 42,520, dated April 26, 1864; Reissue No. 3,747, dated November 23, 1869.

*To all whom it may concern:*

Be it known that I, WILLIAM WESTLAKE, formerly of Milwaukee, State of Wisconsin, now of the city of Chicago, in the county of Cook and State of Illinois, have invented certain new and useful Improvements in Lanterns; and I do hereby declare that the following is a full, clear, and exact description thereof, reference being had to the accompanying drawings, making part of this specification, in which—

Figure 2:
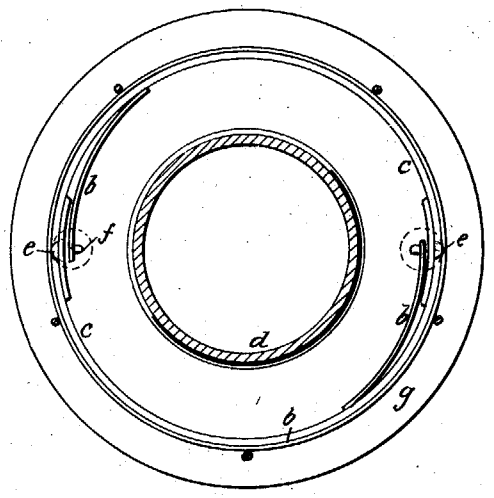
Figure 1:
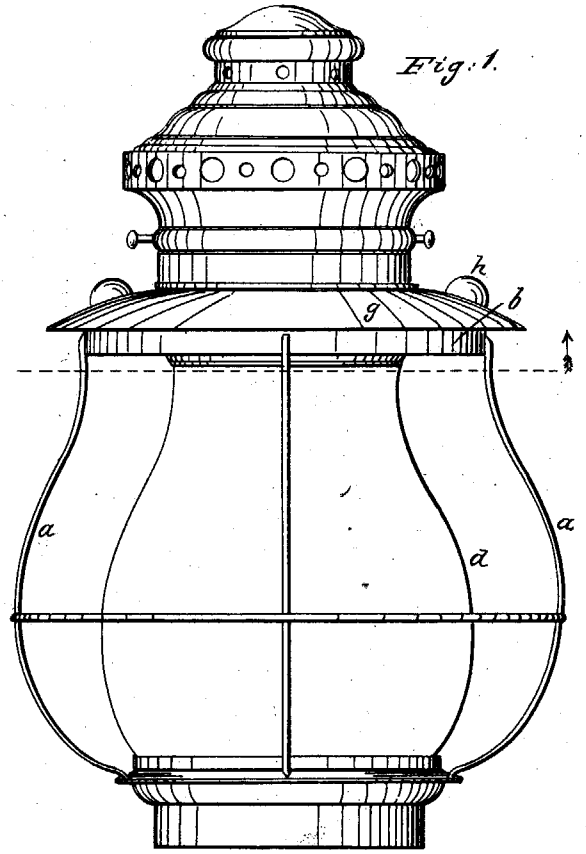

Figure 1 represents a side elevation of my lantern with the base removed; and Fig. 2, a transverse section on the red line of Fig. 1, showing the dome of the lantern inverted.

Like letters refer to the same parts in both figures.

The nature and objects of my invention consist in the construction of lantern-guards without hooks, projections, or catches sticking out and interfering with the safe and convenient use of the lantern, and so that the same can be readily attached or detached; in the employment of a band or disk to fill or cover the space between the enlarged band or ring at the upper end of the guard and the top of the globe; and in the application of suitable fastenings to secure the dome to the guard.

To enable others skilled in the art to make and use my improvements, I will describe their construction and operation.

The guard *a* is made of the usual material, and is made entire, without hinges or any separating of its parts, and separate from the base and dome of the lantern. The upper ring or annular band, *b*, has, as shown, a flange, *c*, on the inside, under which the catches *e* pass when the guard is fully fitted to the lantern. Springs *f* are attached to the flange or cap-piece *g* of the dome, on the under side, and are provided with catches *e*, and with stems which pass through *g* and support knobs *h*, so that the fastening can be operated above the cap-piece or disk *g*.

The upper ring or band, *b*, of the guard is made of sufficient diameter for the globe to pass through it; and as it is important that the top of the globe should be contracted, I use the band *g* to hold the globe at the top and to fill or cover the space between the enlarged upper ring or band of the guard and the top of the globe. The necessary fastenings are also placed between the guard and globe.

The base is not shown in the drawings, but can be made and connected in any desired manner.

In operation the catches are released by pressing upon the knobs *h*, when either the guard or the globe can be removed.

As is evident, other catches and means for securing the guard to the lantern may be used in the place of those here described.

What I claim as my invention, and desire to secure by Letters Patent, is—

1. The lantern-guard *a*, constructed entire, without hinge or joint, so that as a whole it can be readily attached to or removed from the lantern, as set forth.

2. The disk, *g*, in combination with the ring or band *b* of the guard, and fastenings *e*, substantially as and for the purposes specified.

3. The guard *a*, in combination with the disk *g*, fastenings *e*, and removable globe *d*, substantially as specified.

WILLIAM WESTLAKE.

Witnesses:

E. A. WEST,

L. L. BOND.